United States Patent Office 3,324,239
Patented June 6, 1967

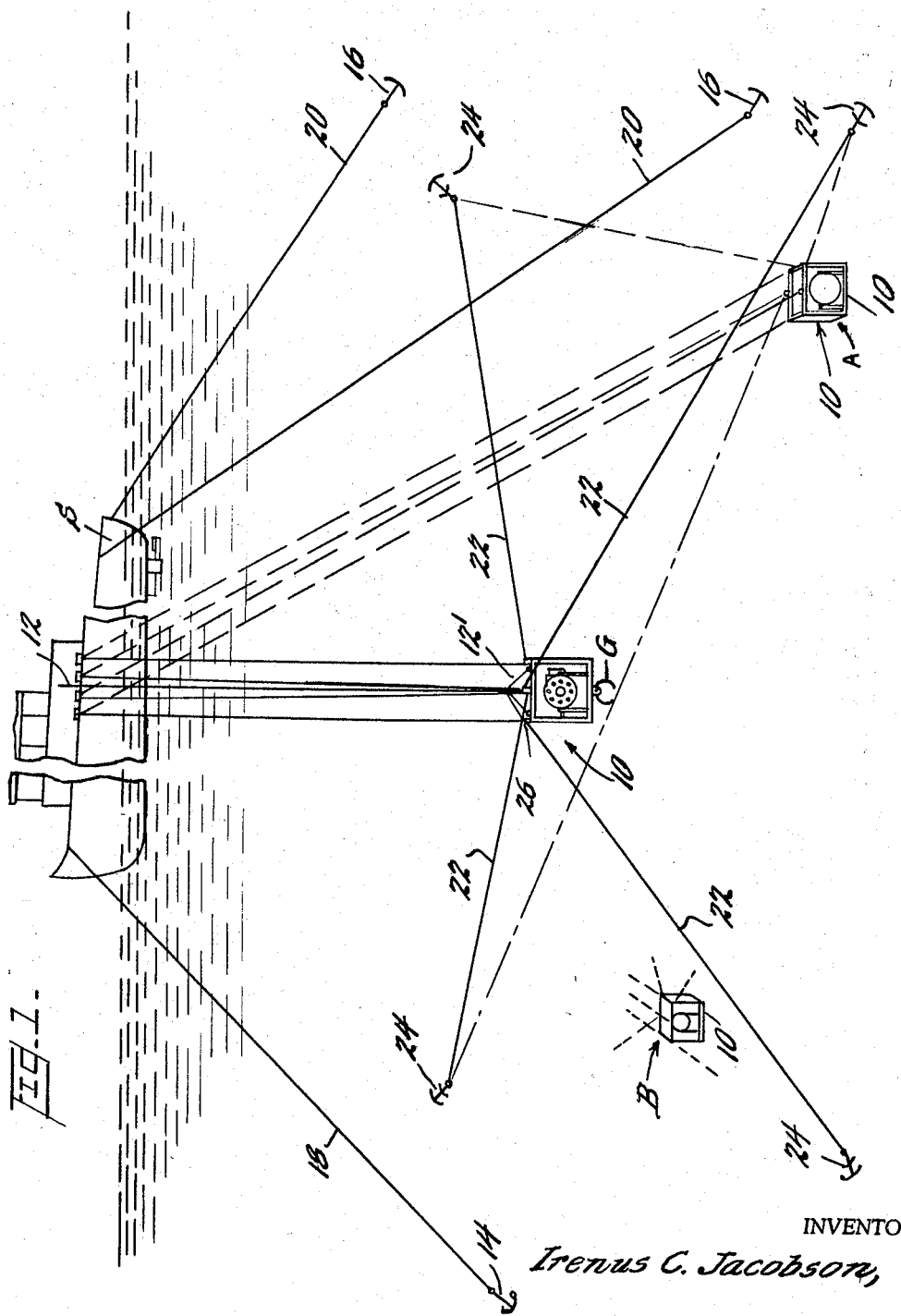

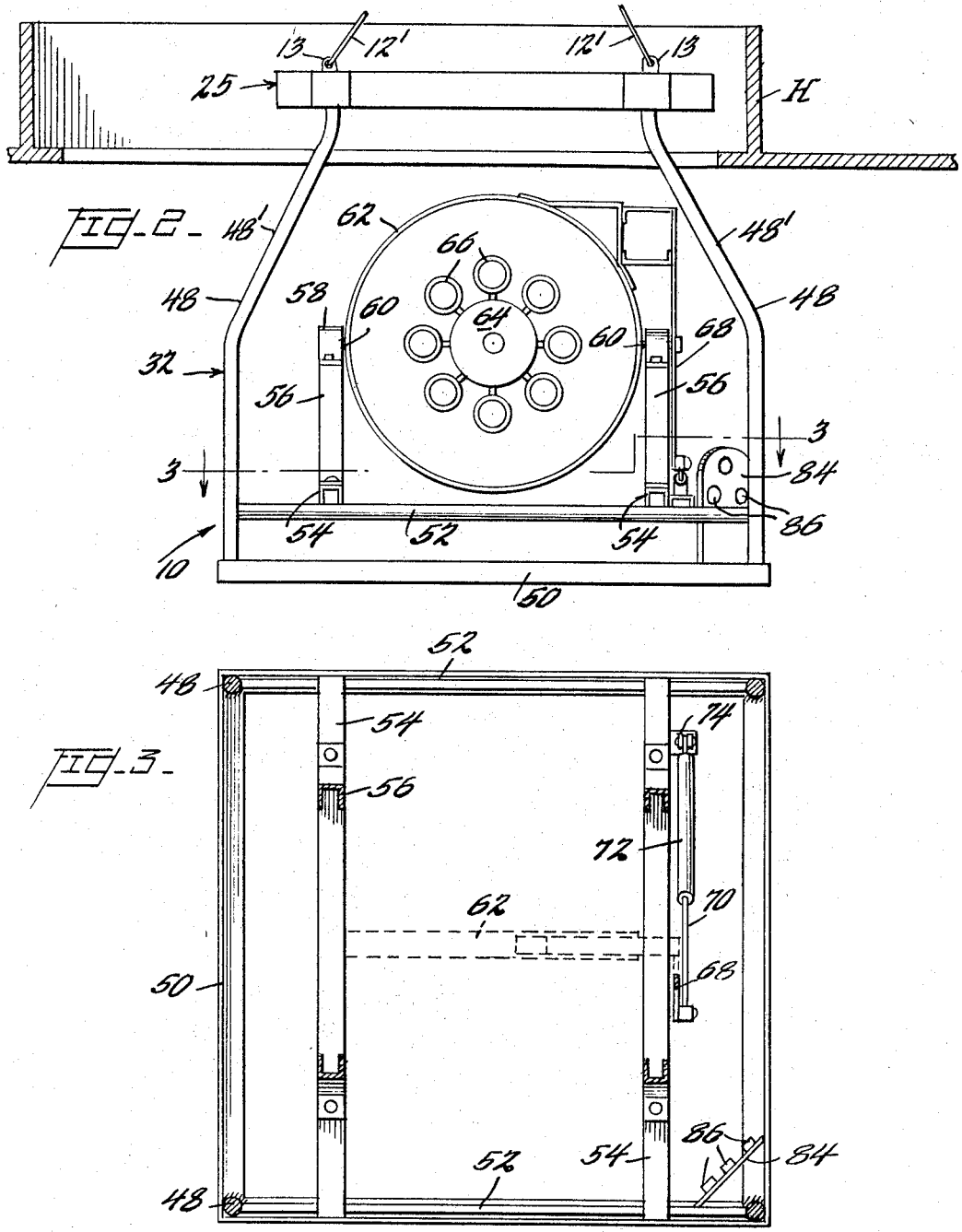

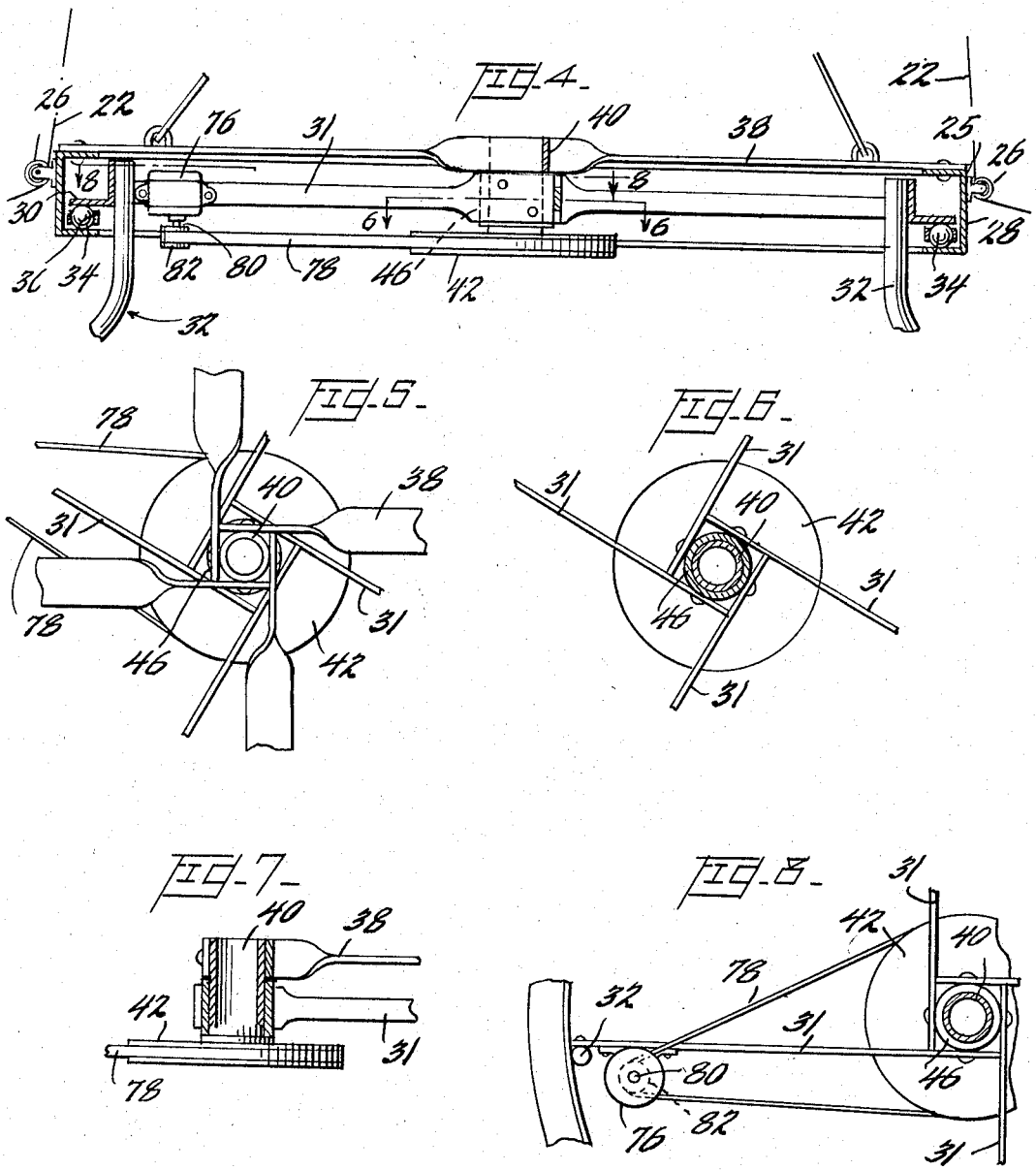

3,324,239
UNDERWATER EXPLORATION DEVICE
Irenus C. Jacobson, 6533 19th NE.,
Seattle, Wash. 98115
Filed July 22, 1963, Ser. No. 296,764
11 Claims. (Cl. 178—6.8)

This invention relates to improvements in an underwater searching and object retrieving device and is an improvement over the device disclosed in my prior Patent 3,014,984, granted Dec. 26, 1961.

In such a device as exemplified in my foregoing patent, the underwater television camera or other visual scanning device is supported within a rigid frame or cage for substantially universal though restricted angular adjustment by power means controllable from a surface unit. The cage, in turn, is suspended from the surface unit, normally at a suitable distance above the bottom of the body of water. Means controllable from the surface unit are adapted to shift the bodily position of the device laterally over the ocean bottom and power means supported in the cage and controllable from the surface unit are adapted to angularly adjust the position of the scanning device in the cage. The arrangement has been such that the visual scanning device could observe, and thereby furnish information for the accurate control of a grappling device, also carried by the cage, to the end that following the location of an object by the scanning device, the grappling device could be caused by remote control to readily engage the device for its retrieval and elevation to the surface.

It is an important object of the present invention to provide such a device in which the television camera or other visual scanning element is capable of controlled but unrestricted angular movement for a full 360° about a vertical axis whereby to greatly increase the area which it can scan from a given location and to increase its versatility and utility.

Further, it is an important object to impart such angular adjustability to the cage in its entirety whereby the grapple or other retrieval mechanism supported by the cage may be similarly capable of 360° of controlled angular movement about a vertical axis, as may the object grasped thereby.

It has been found that these features greatly increase the utility of the device by facilitating its proper orientation for the initial engagement of objects by the grapple, as well as adapting it for subsequent angular positioning of such objects in order to clear obstructions during their upward retrieval movement.

It is a further important object to rotatably support the entire cage by means affording ample strength to bear the weight, not only of the cage itself, but also of the grapple and such relatively heavy objects as may be engaged thereby.

Similarly, it is an object to provide a relatively simple and compact power means capable of providing the necessary angular adjustment of the cage, together with such heavy objects as may be suspended therefrom by way of the grapple.

It is a further object to provide in conjunction with a device having the foregoing features and advantages, a suitable means for guiding the various power and control lines to the power actuated mechanisms on the cage in such manner that these lines extend into the cage along the axis about which the cage is rotated, whereby to minimize the possibility of snarling and undue twisting.

In accordance with the instant invention, there is provided a suitable support which is nonrotatably suspended from the surface unit and which, if desired, may be laterally moved over the ocean bottom in substantially the same manner as in my aforesaid patent. This support includes an annular bearing member which cooperates with a second annular bearing member constituting a part of the cage, to support the cage for unrestricted rotary adjustment through a full 360° about a normally vertical axis. Remotely controllable power means are operatedly interconnected between the cage and its support for selectively adjusting the angular position of the cage about its vertical axis, and an underwater scanning element which may be of the visual type is trunnionized in the cage for angular elevational adjustment about a normally horizontal axis whereby it may be directed either generally vertically downwardly toward the ocean bottom or laterally to whatever degree may be desired.

The foregoing structure has the rotatable connection between the support and the cage so formed as to provide a guide opening or passage coincident with the vertical axis of the cage through which may extend the various control and power lines for the various units carried by cage such as the aforesaid power means, the scanning element itself, the underwater lights and the grapple controlling and actuating elements.

The foregoing, as well as other incidental objects and features of the invention, will be more readily apparent from a consideration of the accompanying specification and drawings of a preferred exemplification of the invention.

In the accompanying drawings:

FIGURE 1 is a diagrammatic elevational view showing the manner in which the underwater exploration and retrieving device of the invention may be suspended from a ship or other surface unit at any desired depth above the ocean bottom, to be laterally positioned at any of various points through means controlled from the surface unit, and to be raised, lowered and universally angularly adjusted, also by way of means controllable from the surface unit.

FIGURE 2 is a relatively enlarged front elevational view of the preferred embodiment of the invention as it appears when being withdrawn upwardly through the hatch of a sunken ship and showing the manner in which it may cam itself laterally free of overhanging obstacles such as portions of the hatch structure, the latter being illustrated fragmentarily only.

FIGURE 3 is a plan section on the line 3—3 of FIGURE 2.

FIGURE 4 is an enlarged vertical cross section in the axial plane of the device showing the details of the rotary interconnection between the cage and its support.

FIGURE 5 is an enlarged plan view of the central interconnected bearing portions of the support and the rotary cage.

FIGURE 6 is a section on the line 6—6 of FIGURE 4.

FIGURE 7 is a detail axial section through the associated axle and hub portions of the device; and FIGURE 8 is a fragmentary plan section taken on the line 8—8 of FIGURE 4 and illustrating the preferred arrangement of the power means for controlling the rotary adjustment of the cage with respect to its support.

Referring now in detail to the accompanying drawings and referring first to FIGURE 1, it will be seen that the underwater exploration device 10 of the invention is adapted to be suspended from a surface ship or unit S by a suitable line 12 which will be understood to extend from a power winch on the ship, the arrangement being such that the winch may be operated to raise and lower the device to whatever extent may be desired. At its lower end, line 12 is subdivided into branches 12' connected to attaching rings 13 fixed on support 25. The ship itself will normally be maintained on station through the usual bow and stern anchors 14 and 16 and their associated lines 18 and 20 respectively.

For laterally adjusting the position of the device over the ocean bottom there is employed an arrangement similar to that disclosed in my foregoing patent. In accordance with this, a plurality of lines or flexible cables, each designated 22, extend from anchors 24, disposed at preselected locations on the ocean bottom, these being shown generally as located at the corners of an imaginary rectangle. The lines extend upwardly through sheaves or pulleys 26 on the support member 25 of device 10. After passing through the sheaves, these cables respectively extend upwardly and each is operatively connected to a power windlass on the ship, the windlasses being controllable in the manner fully explained in my patent, whereby to laterally shift the position of the device as desired.

In FIGURE 1, the device is shown in its vertically suspended position, and also is shown diagrammatically in two of its many possible laterally shifted positions A and B respectively.

Not only do the lines 22 afford a means for laterally shifting or moving the device, but in the present embodiment of the invention, they perform the important function of securing the support 25 of the device against rotation, or at least against any substantial rotary movement.

Referring to FIGURE 4, the rigid support or supporting element 25 includes an annular bearing member or portion exemplified by the flange 28 for cooperation with a second annular bearing or bearing member 30 fixedly secured to and constituting a part of the cage, generally designated 32, of the device. In the present embodiment of the invention the support comprises a channel iron 25, the channel of which opens radially inwardly, and the lower flange 28 of which constitutes the annular bearing member above mentioned. Such a channel member may be fabricated from a pair of angle irons of circular configuration having their vertical flanges butt-welded together.

As will be seen in FIGURE 4, the rotary cage 32 has its bearing member 30 rotatably supported on the support 25, as by means of the ball bearings 34, interposed between the two bearing members or flanges 28 and 30 and secured against displacement by reception in openings or sockets within an annular retainer 36.

Referring to FIGURES 4 to 7, a series of generally radial spokes 38 secured to and extending inwardly from the upper flange of the supports 25 have their inner ends affixed to and supporting a tubular axle or shaft 40. This shaft depends substantially below the plane of the spokes 38 and at its lower end, in axially spaced relation to said plane, has fixed thereon a sprocket wheel 42 which together with the support 25 is normally restrained against rotation by cables 22. The cage bearing member 30, which in the present instance will be seen to comprise an annularly disposed angle iron member, has a plurality of spokes secured to and radiating inwardly from its vertical flange. These spokes 44 have their inner end portions fixedly secured to and supporting a hub or sleeve 46, which is rotatably journalled on the hollow axle or shaft 40 and which coaxially centers the cage and its bearing 30 with respect to the support and the circular edge of the bearing 34, whereby the radially extending flange of the bearing member 30 will avoid frictional engagement with the inner vertical wall of the channel support 25. Moreover, the tubular shaft 40 provides a centrally located guideway through which the various power and control lines and/or conduits may extend to their respective components on or within the rotary cage 32.

It will be apparent that the bearing member or ring 30 is the sole means by which the cage 32 is rotatably suspended from the support 25, as the hub or sleeve 46 cooperates with axle 40 merely for centering purposes without functioning in the manner of a thrust bearing.

The main body of the cage 32 is defined by the rigid legs 48 of which there are four in the present instance, together with the rectangularly arranged angle iron members 50, rigidly interconnecting the lower ends of the respective legs.

A pair of relatively opposed parallel rigid members 52 secured to the legs 48 somewhat above the bottom of the cage cooperate with a pair of rigid crosspieces 54 affixed thereon to define a rigid open platform on which there are supported a pair of relatively laterally spaced brackets, each designated 56. The aligned trunnion bearings 58 mounted on these brackets rotatably receive coaxial stub axles 60 extending outwardly from the circular frame 62. Fixedly secured to the frame 62 in any appropriate manner and supported thereby may be any suitable underwater scanning device, preferably of the visual type, such as the centrally located television camera 64 encircled by a plurality of electric lights 66, so directed as to illuminate the area toward which the television camera 64 is directed. In general, the arrangement of the camera 64 and lights 66, together with their supporting frame or mechanism 62, may be substantially as disclosed in my earlier patent. Their specific disposition constitutes no part of the present invention.

It will thus be seen that in accordance with the foregoing description the underwater scanning element 64 is trunnioned in the cage 32 for angular adjustment about a normally horizontal axis, defined by the bearing 58 and stub shafts 60 whereby the television camera 64 may be subjected to adjustment from a downwardly directed vertical position throughout a range extending appreciably above a horizontal position. Since the scanning device is secured against any angular displacement about a vertical axis with respect to the cage 32 and its lens is normally directed outwardly between adjoining depending legs 48, it will be apparent that no portion of the cage interferes with the view of the device in a generally lateral direction. Moreover, due to the fact that the platform defined by the members 52 and 54 defines a rectangular opening through which the device may be directed in a vertically downward direction, it will be apparent that a minimum interference with the view of the camera exists.

For adjusting the angle of the device and its supporting frame 62, one of the stub shafts 60 has a crank arm 68 fixed thereto. As shown in FIGURE 3, the free end of this crank arm 68 is pivotally connected to the piston rod 70 of a hydraulically actuated cylinder and piston unit 72, in which the cylinder portion is pivoted at 74 to a bracket affixed to the adjacent cross platform member 54.

The fluid supply and discharge lines for actuation of the unit 72, as above mentioned, may extend upwardly to the surface unit S through the hollow axle or shaft 40, shown in FIGURES 4 to 8 inclusive. It will be understood that the cylinder and piston unit 72 is of the double-acting type and controllable by conventional valve means from the surface unit S in such manner that its piston rod 70 may be extended or retracted to tile the entire frame 62, together with the viewing device 64 and lights 66, about the horizontal axis defined by the stub shafts 60. It will be further apparent that this tilting or elevational adjustment is entirely independent of any rotational adjustment of the cage 32 about the vertical axis defined by the thrust-bearing assembly 30, 24 and 36, shown in FIGURE 4.

For providing the desired lateral or sweeping adjustment of the frame 62 and scanning device 64 about a vertical axis, there is provided a remotely controllable power means which, as illustrated in FIGURES 4 and 8, is exemplified by the electric motor 76 and its associated gearing 78 and 42. In the present instance, the motor 76 is affixed to the vertical flange 31 of the cage bearing 30. This motor is preferably of the gear reduction type having an output shaft 80 on which is keyed a drive sprocket 82. The flexible drive 78 establishes a driving connection between the sprocket 82 and the sprocket or sheave element 42, which is fixed by way of the shaft 40 and spokes 38 to the nonrotating supports 25. Accordingly, the controllable power means exemplified by the motor and its associated elements 82, 78 and 42 is operatively interconnected between the supports 25 and the cage 32 for selectively adjusting the angular position of the cage about a vertical axis.

The power supply lines from the ship or surface unit S extend to the motor 76 after being guided through the hollow shaft 40, whereby rotation of the cage with respect to the supports 25 may be accomplished without kinking or entangling these lines. The actuation of the motor which is preferably of the reversing type may be achieved through suitable conventional switch means, constituting no part of this invention, which will be disposed at a suitable location on the ship S.

An instrument panel 84, preferably mounted across one corner of the cage 32 may bear certain conventional devices such as depth gauges, thermometers and the like, in position to be viewed when desired by the camera 64.

In the operation of the invention, the underwater exploration device 10 is lowered from ship S, as shown in FIGURE 1, by means of the line 12 which is payed out to desired depth from the windlass on the ship. The lines 22 and anchors 24 are operatively associated with the device in the manner more fully explained in my earlier patent to serve the function of laterally propelling and positioning the device 10 as desired under the control of power operated winches on the ship. The cage 32, together with the viewing device 64 and its associated lights 66 may be afforded a lateral scanning or sweeping movement for a full 360° about the vertical axis defined by its associated bearing means 30, 34 and 36. This action and the extent thereof will be carried out by actuation of the electric motor 76 under the control of suitable control switches aboard the ship. Similarly the angle of elevation of the scanning element 64 and its lights may be varied as desired through control of the hydraulic cylinder and piston unit 72 from the ship.

Assuming that the object being searched for is a sunken ship and that same has been located by the scanning element 64, the entire exploration device 10 may be positioned over or adjacent the sunken ship at any desired point by actuation of the mechanism described in my earlier patent.

For instance, referring to FIGURE 2 of the drawing, the device 10 may be accurately positioned directly over an open hatch H of the sunken ship, said hatch and surrounding portions being illustrated fragmentarily at H in FIGURE 2. Under the guidance of the information transmitted to the ship by way of the television camera 64, the device 10 may then be lowered through the hatch H into the hold of the ship to retrieve an object therein by the use of conventional remotely controlled grapple means suspended from the cage 32, such means designated as G, being illustrated diagrammatically in FIGURE 1 and being similar to the grapple disclosed in my earlier patent. It will be understood that the grapple G however is secured to the cage for rotation therewith. Accordingly, after the grapple has engaged an object within the hold of the ship, the object may be properly oriented for passage, or retrieval, upwardly through the open hatchway H by angular adjustment of the cage 32 facilitated by the information transmitted from the television camera 64, the latter being capable of elevational adjustment independently of this angular movement as will be readily apparent.

By virtue of the fact that in the preferred embodiment of the invention, the rigid cage legs 48 have their upper end portions curved inwardly toward the vertical rotational axis of the cage, as shown in FIGURE 2, these legs will respectively present outwardly directed sloping cam surfaces 48′ for engagement with any overhanging deck portion or other obstruction adjacent the hatch opening H to deflect the cage and, thus, the entire device 10 laterally from beneath such obstruction so that it may pass freely upwardly beyond same.

It will be readily apparent, therefore, that the instant invention comprises valuable improvements over prior devices by virtue of which it is capable of increased utility and versatility. The angular adjustability of the entire cage about a vertical axis through a 360° range permits not only a most efficient sweeping or lateral scanning action of the television camera, but in addition makes possible the controlled orientation of the position of an object carried by the cage through its grapple or other associated object handling device. Moreover, the extremely large diameter and bearing area of the relatively opposed bearing members 30 and 34 provides a thrust bearing assembly of great strength, capable of effectively supporting objects of extreme weight. Also, the location of the motor 76 at a substantial distance from the vertical rotational axis of the cage, as well as the power reduction achieved by virtue of the gear reduction motor and the small drive pinion 82 on its output shaft, makes possible the positive control and angular adjustment of the cage by an extremely compact power source.

Having thus described my invention, I claim:

1. An underwater exploration device comprising a support including an annular bearing member, means for nonrotatably suspending said support at predetermined depth below the surface of a body of water and above the bottom thereof, a rotary cage having a bearing member supported in said first bearing member for rotary adjustment of said cage through 360° about a normally vertical axis, remotely controllable power means operatively interconnected to said support and to said cage for selectively adjusting the angular position of said cage about said vertical axis relative to said support, an underwater scanning element trunnioned in said cage for angular elevational adjustment about a normally horizontal axis, and remotely controllable power means interconnected between said element and said cage for selectively adjusting the elevation of the element.

2. An underwater exploration device comprising a support including an annular bearing member of a thrust bearing assembly, means for nonrotatably suspending said support below the surface of a body of water and above the bottom thereof, a rotary cage having a bearing member supported in said first bearing member for rotary adjustment of said cage through 360° about a normally vertical axis, remotely controllable power means operatively interconnected to said support and to said cage for selectively adjusting the angular position of said cage about its vertical axis relative to said support, and an underwater scanning element trunnioned in said cage for angular adjustment about a normally horizontal axis.

3. An underwater exploration device comprising a support including an annular bearing member, means for nonrotatably suspending said support below the surface of a body of water and above the bottom thereof, a rotary cage having a bearing member supported in said first bearing member for rotary adjustment of the cage through 360° about a normally vertical axis, remotely controllable power means operatively interconected to said support and to said cage for selective adjustment of the angular position of the cage about said vertical axis relative to said support, and an underwater scanning element carried by said cage for rotary movement therewith.

4. An underwater exploration device comprising a support including an annular bearing member, means for nonrotatably suspending said support at predetermined depth below the surface of a body of water and above the bottom thereof, a rotary cage having a bearing member supported in said first bearing member for rotary adjustment of said cage through 360 degrees about a normally vertical axis, remotely controllable power means operatively interconnected to said support and to said cage for selectively adjusting the angular position of said cage about said vertical axis relative to said support, an underwater scanning element trunnioned in said cage for angular elevational adjustment about a normally horizontal axis, and remotely controllable power means interconnected between said element and said cage for selectively adjusting the elevation of the element, said cage comprising a rigid open platform defining an aperture through which said element may scan the ocean bottom, rigid legs suspending said platform in spaced normally horizontal relation from said second mentioned bearing member, said second mentioned bearing member comprising an annular horizontal flange, said first mentioned bearing member including an annular horizontal flange carried by the support beneath and rotatably supporting said first flange.

5. An underwater exploration device as defined in claim 4, in which a series of ball bearings are interposed between the said flanges.

6. An underwater exploration device as defined in claim 4, in which said rigid legs are respectively curved inwardly toward said vertical axis adjacent their upper ends, to present outwardly directed cam surfaces for engagement with any overhanging obstruction to deflect the cage laterally from beneath such obstruction during upward movement of the cage.

7. An underwater exploration device comprising a support including an annular bearing member, means for nonrotatably suspending said support at predetermined depth below the surface of a body of water and above the bottom thereof, a rotary cage having a bearing member supported in said first bearing member for rotary adjustment of said cage through 360 degrees about a normally vertical axis, remotely controllable power means operatively interconnected to said support and to said cage for selectively adjusting the angular position of said cage about said vertical axis relative to said support, an underwater scanning element trunnioned in said cage for angular elevational adjustment about a normally horizontal axis, and remotely controllable power means interconnected between said element and said cage for selectively adjusting the elevation of the element, said support including an axle fixed to said support and depending coaxially with respect to said bearing members, said cage having a hub fixed coaxially with respect to the cage bearing member and rotatably journaled on said axle for centering the bearing members against relative lateral displacement.

8. An underwater exploration device as defined in claim 7, in which said axle is formed with an axial opening therethrough for the passage of control and power lines in coaxial relation with the bearing members.

9. An underwater exploration device comprising a support including an annular bearing member, means for nonrotatably suspending said support at predetermined depth below the surface of a body of water and above the bottom thereof, a rotary cage having a bearing member supported in said first bearing member for rotary adjustment of said cage through 360 degrees about a normally vertical axis, remotely controllable power means operatively interconnected to said support and to said cage for selectively adjusting the angular position of said cage about said vertical axis relative to said support, an underwater scanning element trunnioned in said cage for angular elevational adjustment about a normally horizontal axis, and remotely controllable power means interconnected between said element and said cage for selectively adjusting the elevation of the element, said first mentioned power means comprising a motor affixed with respect to one of said members, and gearing establishing an operative connection between said motor and the other said member for relatively rotating the said members about their common axis.

10. An underwater exploration device comprising a support including an annular bearing member, means for nonrotatably suspending said support at predetermined depth below the surface of a body of water and above the bottom thereof, a rotary cage having a bearing member supported in said first bearing member for rotary adjustment of said cage through 360 degrees about a normally vertical axis, remotely controllable power means operatively interconnected to said support and to said cage for selectively adjusting the angular position of said cage about said vertical axis relative to said support, an underwater scanning element trunnioned in said cage for angular elevational adjustment about a normally horizontal axis, and remotely controllable power means interconnected between said element and said cage for selectively adjusting the elevation of the element, said first mentioned power means comprising a motor fixed to said cage radially outwardly from the said vertical axis, a sprocket wheel affixed to said support coaxially to the bearing member thereof, said motor having an output shaft parallel to said vertical axis, a drive sprocket fixed on said shaft and a flexible drive connection between said sprockets.

11. An underwater exploration device as defined in claim 10, in which said motor is an electric motor, said bearing members being rotatably connected at their centers by means defining an axial passageway therethrough, and power lines for said motor guided through said passageway.

References Cited

UNITED STATES PATENTS 2,981,073 4/1961 Robinson _____ 178—6
3,014,984 12/1961 Jacobson _____ 178—6

JOHN W. CALDWELL, *Acting Primary Examiner.*

J. A. ORSINO, *Assistant Examiner.*